United States Patent
Khafagy et al.

(10) Patent No.: US 10,407,046 B2
(45) Date of Patent: Sep. 10, 2019

(54) ACTIVE FRONT STEERING CURRENT CONTROL FOR ENGINE STOP/START VEHICLES

(71) Applicant: FORD GLOBAL TECHNOLOGIES, LLC, Dearborn, MI (US)

(72) Inventors: Hafiz Shafeek Khafagy, Dearborn, MI (US); Attila Benak, Cologne (DE); Kirk Pebley, Novi, MI (US); Gregory Ziemba, Grosse Pointe, MI (US); Eric Michael Rademacher, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 15/000,567

(22) Filed: Jan. 19, 2016

(65) Prior Publication Data
US 2017/0203747 A1    Jul. 20, 2017

(51) Int. Cl.
| | |
|---|---|
| *B60W 10/20* | (2006.01) |
| *B60W 10/06* | (2006.01) |
| *B60W 30/192* | (2012.01) |
| *B62D 5/04* | (2006.01) |
| *F02N 11/08* | (2006.01) |

(52) U.S. Cl.
CPC .......... *B60W 10/20* (2013.01); *B60W 10/06* (2013.01); *B60W 30/192* (2013.01); *B62D 5/0457* (2013.01); *F02N 11/0803* (2013.01); *F02N 11/084* (2013.01); *B60W 2510/20* (2013.01); *B60W 2710/06* (2013.01); *B60W 2710/20* (2013.01); *F02N 2200/0801* (2013.01); *F02N 2200/0808* (2013.01)

(58) Field of Classification Search
CPC .... B60W 10/20; B60W 10/06; B60W 30/192; B60W 2710/20; B60W 2510/20; B60W 2710/06; B62D 5/0457
See application file for complete search history.

(56) References Cited

U.S. PATENT DOCUMENTS

| | | | |
|---|---|---|---|
| 6,816,765 B2 | 11/2004 | Yamamoto et al. | |
| 7,634,340 B2 | 12/2009 | Katrak et al. | |
| 8,380,399 B2 | 2/2013 | Fujimoto | |
| 8,504,247 B2 | 8/2013 | Yamashita | |
| 8,727,067 B2 * | 5/2014 | Gibson | B62D 5/0481 180/443 |
| 2012/0330508 A1 * | 12/2012 | Pebley | B62D 5/046 701/41 |
| 2013/0001006 A1 * | 1/2013 | Gibson | B62D 5/0481 180/446 |
| 2013/0002210 A1 * | 1/2013 | Gibson | B60W 10/30 322/7 |
| 2014/0229067 A1 * | 8/2014 | Gibson | B62D 5/0481 701/41 |

* cited by examiner

*Primary Examiner* — Jelani A Smith
*Assistant Examiner* — Majdi Alsomiri
(74) *Attorney, Agent, or Firm* — David Kelley; Brooks Kushman P.C.

(57) ABSTRACT

A vehicle includes an engine configured for autostop and autostart. The vehicle further includes an electric actuator for an active front steering system. Before the engine is autostopped, a controlled decrease in demand current for the electric actuator is initiated. After the engine is autostarted, a controlled increase in demand current for the electric actuator is initiated.

13 Claims, 4 Drawing Sheets

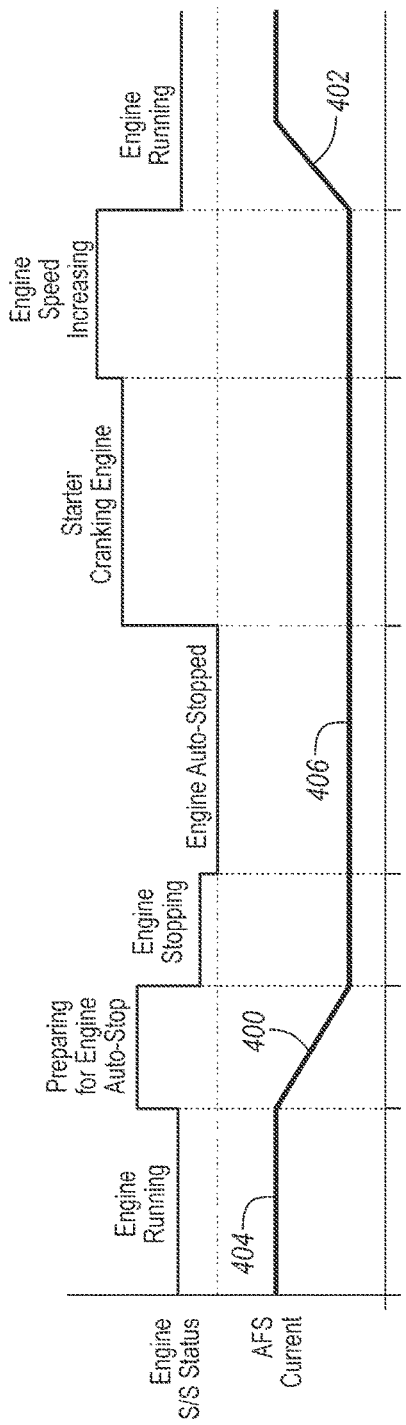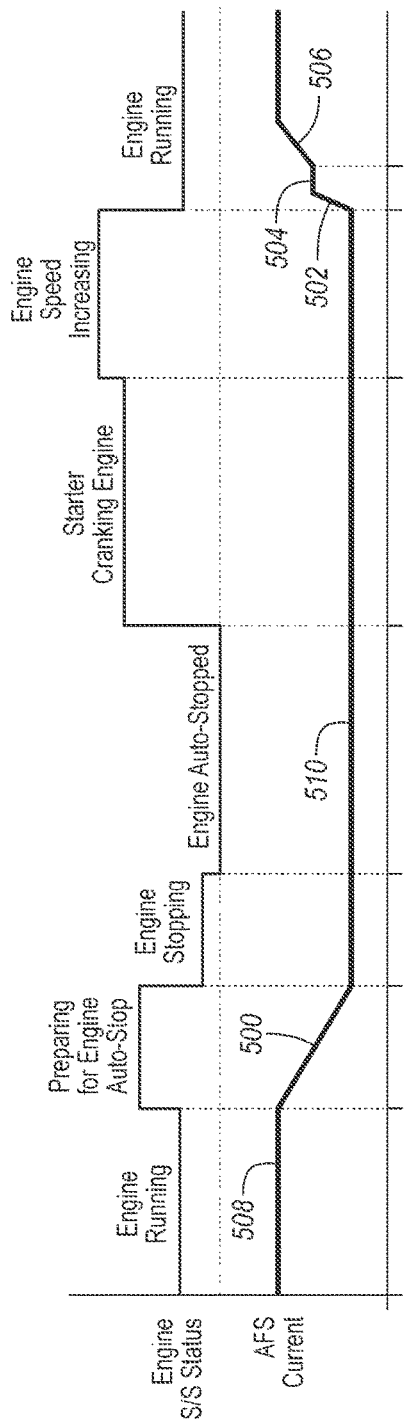

ACTIVE FRONT STEERING CURRENT CONTROL FOR ENGINE STOP/START VEHICLES

TECHNICAL FIELD

This application generally relates to controlling an active front steering system in a vehicle that includes engine start/stop function.

BACKGROUND

A micro-hybrid or start/stop vehicle can selectively turn its engine off during portions of a drive cycle to conserve fuel. As an example, a stop/start vehicle can turn its engine off while the vehicle is stopped rather than allow the engine to idle. The engine can then be restarted, for example, when a driver steps on the accelerator pedal. The start/stop vehicle may also include an active front steering system that varies a gear ratio at which the wheels turn in response to rotation of a steering wheel.

SUMMARY

In some configurations, a vehicle includes an engine. The vehicle also includes an active front steering system including an electric actuator. The vehicle also includes a controller programmed to, in response to receiving a request to transition the engine to an autostop state while a demand current for the electric actuator exceeds a predetermined current, reduce the demand current to the predetermined current at a predetermined rate that prevents flair of the engine prior to transitioning the engine to the autostop state.

Some configurations may include one or more of the following features. The vehicle in which the controller is further programmed to, in response to the vehicle decelerating to a speed less than a predetermined speed, reduce the demand current at the predetermined rate. The vehicle in which the predetermined current is a current level that prevents a transition to an autostart state. The vehicle in which the predetermined rate is such that the reduction is completed in a predetermined amount of time. The vehicle in which the predetermined amount of time decreases as a difference between a present operating current and the predetermined current decreases. The vehicle in which the controller is further programmed to transition the engine to the autostop state in response to the demand current achieving the predetermined current. The vehicle in which the predetermined current is a current level that permits transitioning the engine to the autostop state.

In some configurations, a vehicle includes an engine. The vehicle also includes an active front steering system including an electric actuator. The vehicle also includes a controller programmed to, in response to a demand current request for the electric actuator being greater than a predetermined threshold during an autostart of the engine, increase, after completion of the autostart, a demand current of the electric actuator to a level of the demand current request over a predetermined time period that prevents sag of the engine.

Some configurations may include one or more of the following features. The vehicle in which the controller is further programmed to increase the demand current in response to a generator that is coupled to the engine being in an operating mode to provide electrical energy. The vehicle in which the controller is further programmed to increase the demand current at a predetermined rate. The vehicle in which the controller is further programmed to increase the demand current at a first predetermined rate to an intermediate current less than the level and increase the demand current at a second predetermined rate to the level. The vehicle in which the first predetermined rate is greater than the second predetermined rate. The vehicle in which the controller is further programmed to, in response to the demand current request becoming greater than the predetermined threshold after completion of the autostart, increase the demand current to the level over the predetermined time period that prevents sag of the engine.

In some configurations, a method for controlling a demand current of an electric actuator for an active front steering system in a vehicle includes reducing by a controller the demand current of the electric actuator at a predetermined rate that is based on a maximum engine torque reduction rate in response to a request for engine autostop to prevent engine flair.

Some configurations may include one or more of the following features. The method may include increasing by the controller the demand current of the electric actuator at an other predetermined rate that is based on a maximum engine torque increase rate in response to completion of an engine autostart to prevent engine sag. The method may include increasing by the controller the demand current at the other predetermined rate for a first predetermined time and, after the first predetermined time, increasing the demand current at yet an other predetermined rate for a second predetermined time. The method may include maintaining by the controller the demand current at a predetermined current value for a predetermined hold time after the first predetermined time before increasing the demand current at the yet an other predetermined rate. The method in which the other predetermined rate is greater than the yet an other predetermined rate. The method may include reducing by the controller the demand current to a predetermined current level in response to the request for engine autostop.

BRIEF DESCRIPTION OF THE DRAWINGS

FIG. 4 is a possible timing diagram depicting current in relation to engine start/stop state having a single increase rate.

FIG. 5 is a possible timing diagram depicting current in relation to engine start/stop having two increase phases.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
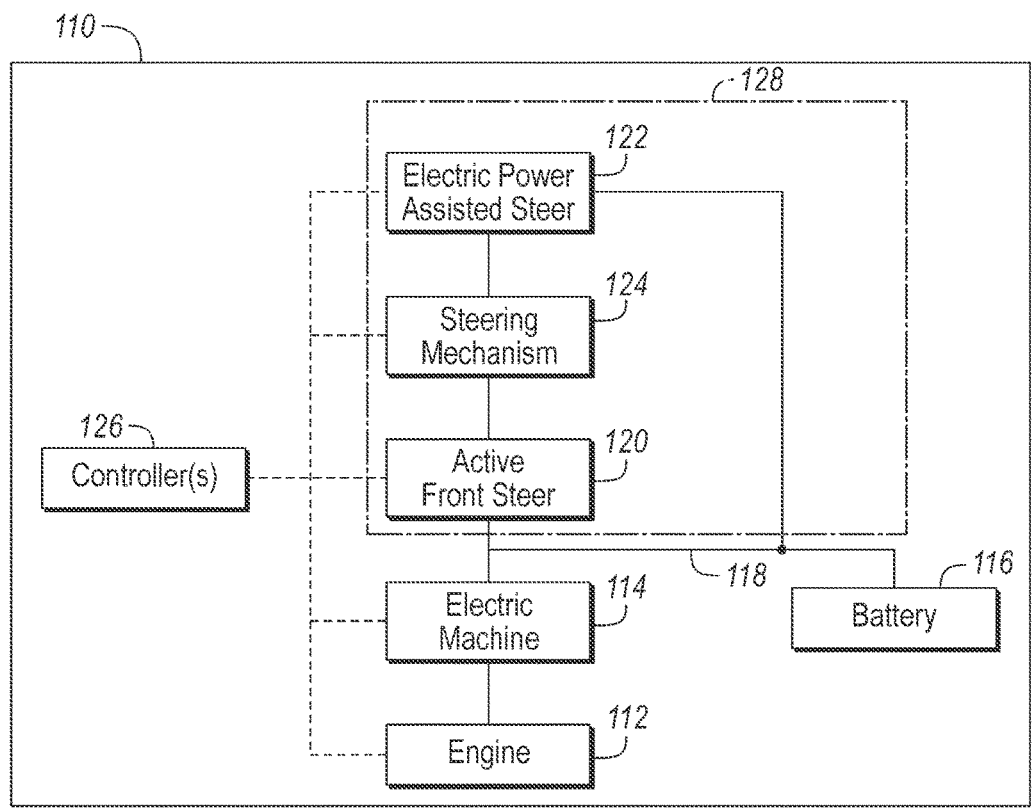
FIG. 1 is a diagram of an exemplary stop/start vehicle illustrating typical components.

FIG. 1 depicts an exemplary block diagram of a vehicle. A vehicle 110 may include an engine 112 for powering the vehicle 110. The engine 112 may be mechanically coupled to an electric machine 114. The electric machine 114 may function as an alternator and a starter. When operating as a starter, the electric machine 114 may receive electrical power from a battery 116 over a power network 118. The electric machine 114 may convert the electrical power into mechanical rotation to spin the engine 112 to start the engine 112.

When operating as an alternator or generator, the electric machine 114 may convert mechanical energy from rotation of the engine 112 into electrical energy on the power network 118. The electrical energy may be stored in the battery 116 or utilized by electrical components coupled to the power network 118.

The vehicle 110 may include a steering system 128 that includes a steering mechanism 124 coupled to front wheels of the vehicle 110. The steering system 128 may include an Active Front Steering (AFS) module 120. The AFS module 120 may assist in driving the steering mechanism 124 to vary a gear ratio at which the wheels turn in response to rotation of a steering wheel. For example, at lower vehicle speeds, a high gear ratio may be implemented such that the steering wheel is turned less for a given steering angle. This allows for sharp turns to be made with less steering wheel input. At higher vehicle speeds, the gear ratio may be reduced such that the steering wheel is turned more for a given steering angle. This reduces the sensitivity of the steering system 128 to changes in the steering wheel at higher speeds. The net effect is that, at higher speeds, the wheels may turn less in response to a given amount of rotation of the steering wheel.

The steering system 128 may include an Electric Power Assisted Steering (EPAS) module 122 that may work in conjunction with the steering mechanism 124. The EPAS module 122 may assist in driving the steering mechanism 124 to reduce the amount of operator effort required to steer the vehicle 110. The EPAS module 122 may include an electric motor that assists driving the steering mechanism 124. The EPAS module 122 may add torque, in addition to the torque provided by the operator, to change the direction of the front wheels.

The AFS module 120 and the EPAS module 122 may be electrically coupled to the power network 118. Power may be provided to the power network 118 by energy stored in the battery 116. The electric machine 114 may also provide power to the power network 118 when operating as a generator. The electric machine 114 may be operated to maintain a predetermined voltage on the power network 118. A voltage feedback control may be utilized to adjust a torque of the electric machine 114 to maintain the predetermined voltage. For example, a magnitude of the torque of the electric machine 114 may be decreased in response to the voltage of the power network 118 exceeding the predetermined voltage. The AFS module 120 and the EPAS module 122 may communicate with one or more controllers 126 in the vehicle.

The vehicle 110 may include one or more controllers 126 to coordinate and manage the operation of the various components. The one or more controllers 126 may interface with the various devices via hardwired signals or serial communications bus (e.g., Controller Area Network (CAN)). The controllers 126 may include a microprocessor and non-volatile memory for storing data when the controllers 126 are powered down.

The controller 126 may be configured to autostop and autostart the engine 112. During vehicle operation, the engine 112 may be stopped and started during an ignition cycle. Conditions may be monitored to determine when to autostop the engine 112 to improve fuel economy. Conditions may also be monitored to determine when to autostart the engine 112.

Figure 3:
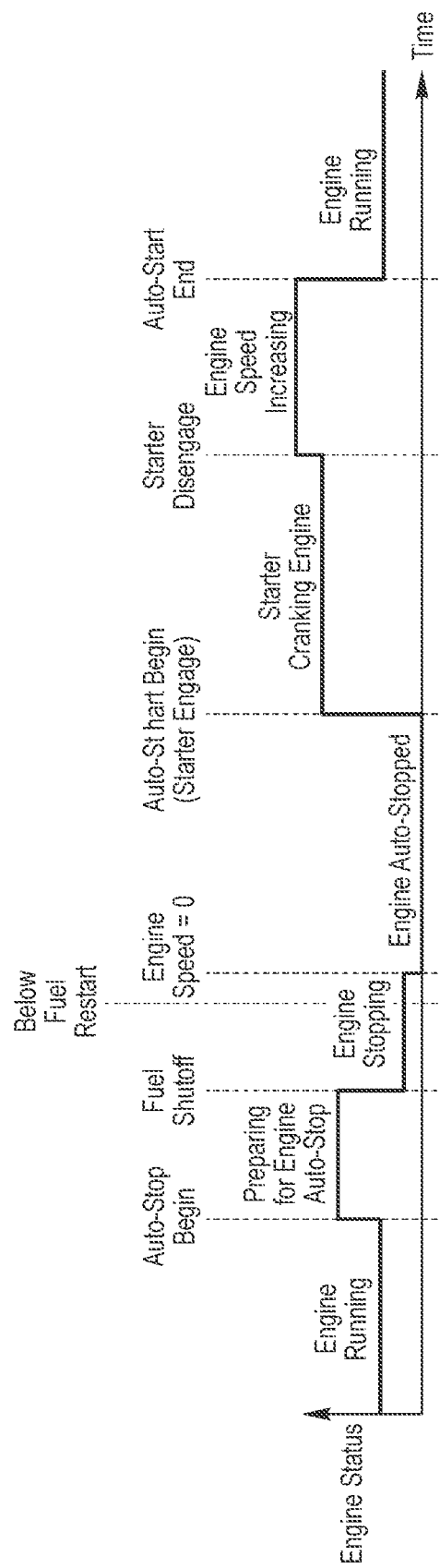
FIG. 3 is a plot illustrating engine status during an auto-stop event.

With reference to FIG. 3, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to zero; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed). An engine auto-stop event may include all stages from "auto-stop begin" through "auto-start end."

Figure 2:
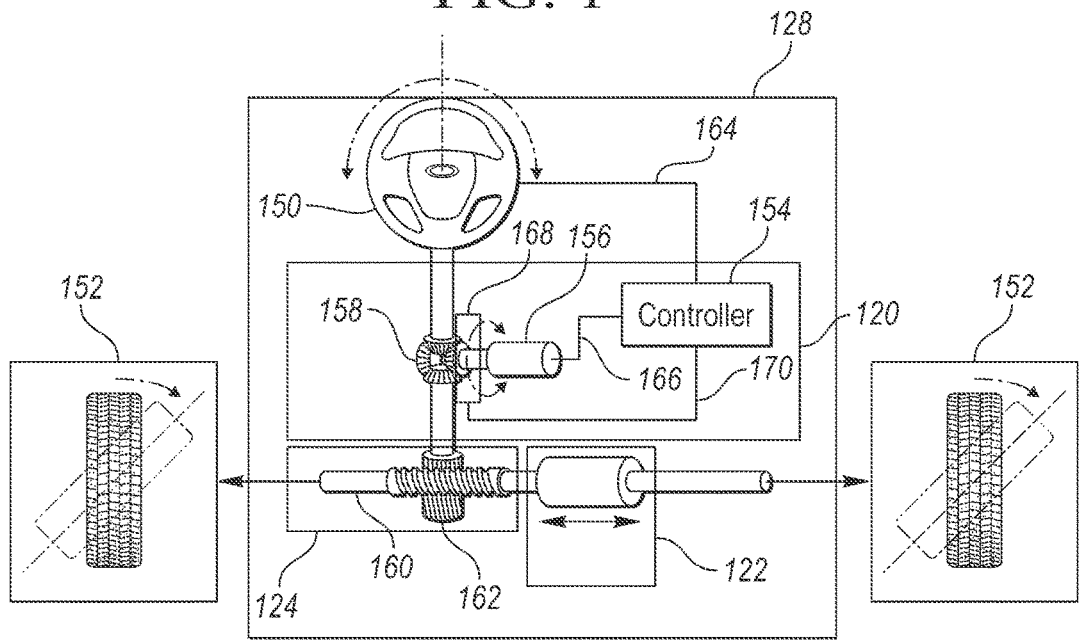
FIG. 2 is a diagram of an exemplary steering system that includes active front steering.

FIG. 2 depicts a diagram of an exemplary steering system 128. The steering system 128 may be configured to steer the vehicle 110 in a direction desired by an operator. The steering system 128 may include a steering wheel 150 that is operated by the operator. The steering system 128 may convert the steering wheel 150 motion into a displacement of the front wheels 152 to cause a change in direction of the vehicle 110. The steering mechanism 124 may be a rack 160 and pinion 162 configuration in which the front wheels 152 are coupled to the rack 160 and the steering wheel 150 is coupled to the pinion 162.

The AFS module 120 may include an electric actuator or electric machine 156 coupled to a differential or planetary gear set 158. The electric machine 156 may cause the pinion 162 to rotate which may cause the rack 160 to move and cause the front wheels 152 to change direction. The steering wheel 150 may be coupled through the AFS gear set 158 as well. A variable gear ratio between the steering wheel 150 and the wheels 152 may be achieved by operating the AFS module 120 to drive the pinion 162 as the steering wheel 150 is turned. The gear ratio may be a ratio between the steering wheel angle and an angle at which the wheels turn (e.g., a wheel steer angle). An AFS controller 154 may receive a steering wheel angle input signal 164 indicative of a position of the steering wheel 150 and may produce one or more output signals 166 to operate the electric machine 156. Additional inputs and outputs may be utilized by the AFS controller 154. The AFS controller 154 may communicate with other controllers, such as an engine controller or a vehicle system controller.

The AFS controller 154 may be programmed to monitor the steering wheel angle input signal 164 from the steering wheel 150. A steering ratio may be determined based on the steering wheel angle and the vehicle speed. Based on the steering ratio, the AFS controller 154 may determine a requested demand current for the electric machine 156. The AFS controller 154 may control the current through the electric machine 156 via the output signals 166.

The AFS module 120 may include a locking mechanism 168. The locking mechanism 168 may be a solenoid actuated device that, when actuated, prevents the electric machine 156 from rotating the pinion 162. When the locking mechanism 168 is engaged, the AFS module 120 cannot assist in steering the vehicle and steering is accomplished using the steering wheel 150 output. The locking mechanism 168 may be controlled by an output signal 170 from the AFS controller 154.

The EPAS 122 and AFS 120 modules are coupled to the power network 118 and derive electrical power from the electric machine 114 or the battery 116. During operation, the EPAS 122 and AFS 120 modules may draw a significant amount of current from the power network 118. Under conditions in which the engine 112 is running and the electric machine 114 is supplying electrical power to the power network 118, the energy stored in the battery 116 may not be depleted. However, when the engine 112 is not running, electrical power is provided by the battery 116. The result may be a drop in voltage of the power network 118 which may negatively impact the EPAS 122 or AFS 120 modules. For example, the voltage may drop low enough so that the EPAS 122 or AFS 120 modules cannot function adequately.

The voltage drop of the battery 116 may be monitored during the engine autostop event. During an engine autostop event, the voltage of the battery 116 may decrease as the electric machine 114 may no longer provide power to the power network 118. The voltage of the battery 116 may drop to a minimum calibrateable threshold. As the AFS system 120 may draw a relatively large current, it is useful to manage the current draw during engine autostops and autostarts.

The EPAS module 122 may be operated in a limited mode during engine autostop events. The EPAS module 122 may be configured to provide no assistance during engine autostop events. Alternatively, the EPAS assist may operate with reduced capability during the engine autostop event. The EPAS module 122 may be operated such that the maximum current draw of the EPAS module 122 is less than a predetermined threshold during engine auto-stop events. The resulting vehicle affect is that the operator torque required to steer the vehicle is increased during engine autostop events.

The operation of the AFS system 120 may be based on an operational status or state of the engine start-stop system. The operational state of the engine start-stop system may be broadcast to the controllers over the communication link. The engine start-stop system may operate in one or more distinct states or stages that may affect the operation of the AFS system 120.

The AFS controller 154 may operate the electric actuator 156 based on a request to change the steering ratio. In response to a request to change the steering ratio, the AFS controller 154 may determine a demand current for the electric actuator 156. Other inputs such as vehicle speed may also be used to determine the demand current. The AFS controller 154 may then cause a current with a magnitude of the demand current to flow through the electric actuator 156. The mode of operation of the AFS system 120 may be based on the state of the engine start/stop system. The AFS controller 154 may receive an input that is indicative of an engine auto stop event.

In preparation for a transition to an engine autostop mode, the AFS current may be reduced. During operation, the AFS 120 may draw a significant amount of current from the power network 118 or battery 116. While the engine 112 is in a running state, the electric machine 114 may be operated to provide the current for the AFS 120. When the engine 112 is an autostop state, the battery 116 must provide current for the AFS 120. It may be desired to prevent large current draws from the battery 116 when the engine 112 is autostopped. It may be desired to reduce the demand current to the electric actuator 156 of the AFS 120 to a reduced current level before allowing the engine 112 to autostop. However, a sudden reduction in the AFS current may cause a sudden rise in voltage output from the electric machine 114. In response to the rise in voltage, the voltage control strategy may reduce the magnitude of the torque command to the electric machine 114 to maintain the voltage at a predefined level. Torque changes to an electric machine 114 may occur faster than engine torque can be changed. In such a situation, the torque load on the engine 112 may be reduced faster than the engine torque can be reduced leading to a rise in engine speed. The difference in torque response may cause the engine speed to rise or flair leading to a possible increase in vehicle speed recognized by the driver.

To reduce the engine flair, the reduction in AFS current may be controlled to allow the engine control strategy to adjust the engine torque to prevent changes in the engine speed. For example, the AFS demand current may be reduced at a predetermined decrease rate of change. In some configurations, the demand current for the electric actuator 156 may be ramped down to a predetermined current in a predetermined amount of time. The predetermined current may be an amount of current to operate the AFS 120 at a minimum level of performance. The predetermined amount of time may be determined based on the response time of the engine torque reduction. For example, the current decrease rate may be based on a maximum engine torque reduction rate. The predetermined decrease rate of change may correspond to a maximum rate of engine torque reduction that can be achieved by the engine control system.

After the engine 112 is autostarted, the AFS current may be returned to a normal operating current. However, a rapid increase in the AFS current may cause a decrease in the power network voltage. Again, the electric machine 114 may respond more quickly to torque changes than the engine 112. In response to the decrease in the power network voltage, the electric machine torque may be increased causing the engine speed to sag leading to a possible decrease in vehicle speed recognized by the driver. In this situation, the torque load may on the engine 112 may increase faster than the engine torque can be increased leading to a decrease in engine speed.

When returning the AFS 120 to the normal operating current, the AFS current may be controlled to prevent undesired changes in the engine speed. The AFS current may be increased at a predetermined increase rate of change. In some configurations, the AFS demand current may be ramped up to the normal operating current in a predetermined amount of time. The predetermined amount of time may be determined based on the response time of the engine torque increase. For example, the increase rate may be based on a maximum engine torque increase rate. The predetermined increase rate of change may correspond to a maximum rate of engine torque increase that can be achieved by the engine control system.

FIG. 4 depicts a graph of AFS current demand relative to the engine start/stop status. For example, when the engine 112 is in a running state, the AFS 120 may be capable of operating at a current level up to a normal operating level 404. When the normal operating level 404 is permitted, the AFS functions may be fully supported. The normal operating level 404 may depend on the steering wheel operation and when AFS operation is demanded. When the engine 112 is in a state preparing for engine autostop, an AFS current decrease phase 400 may be initiated. After the AFS current decrease phase 400, the AFS current may be limited to a limited operation level 406. The limited operation level 406 may continue while the engine is in the autostopped state.

After the engine is autostarted, a current increase phase 402 may be initiated. The current increase phase 402 may be a linear ramp of the current to the normal operating level 404 at a predetermined increase rate.

FIG. 5 depicts a graph of an alternative AFS current demand relative to the engine start/stop state. When the engine is in the running state, the AFS 120 may be capable of operating at a current level up to a normal operating level 508. When the normal operating level 508 is permitted, the AFS functions may be fully supported. The normal operating level 508 may depend on the steering wheel operation and when AFS operation is demanded. When the engine 112 is in a state preparing for engine autostop, an AFS current decrease phase 500 may be initiated. After the AFS current decrease phase 500, the AFS current may be limited to a limited operation level 510. The limited operation level 510 may continue while the engine is in the auto-stopped state. After the engine 112 is autostarted, a first current increase phase 502 may be initiated followed by an intermediate current level 504. The first current increase phase 502 may be a linear ramp of the AFS current up to an intermediate current level 504 at a first predetermined increase rate. The intermediate current level 504 may be followed by a second current increase phase 506. The second current increase phase 506 may be a linear ramp of the current to the normal operating level 508 at a second predetermined increase rate. The first predetermined increase rate may be different than the second predetermined increase rate. In some configuration, the first predetermined increase rate may be greater than the second predetermined increase rate. This may allow the AFS current to be quickly increased to a limited AFS support level that allows some AFS functionality.

Figure 6:
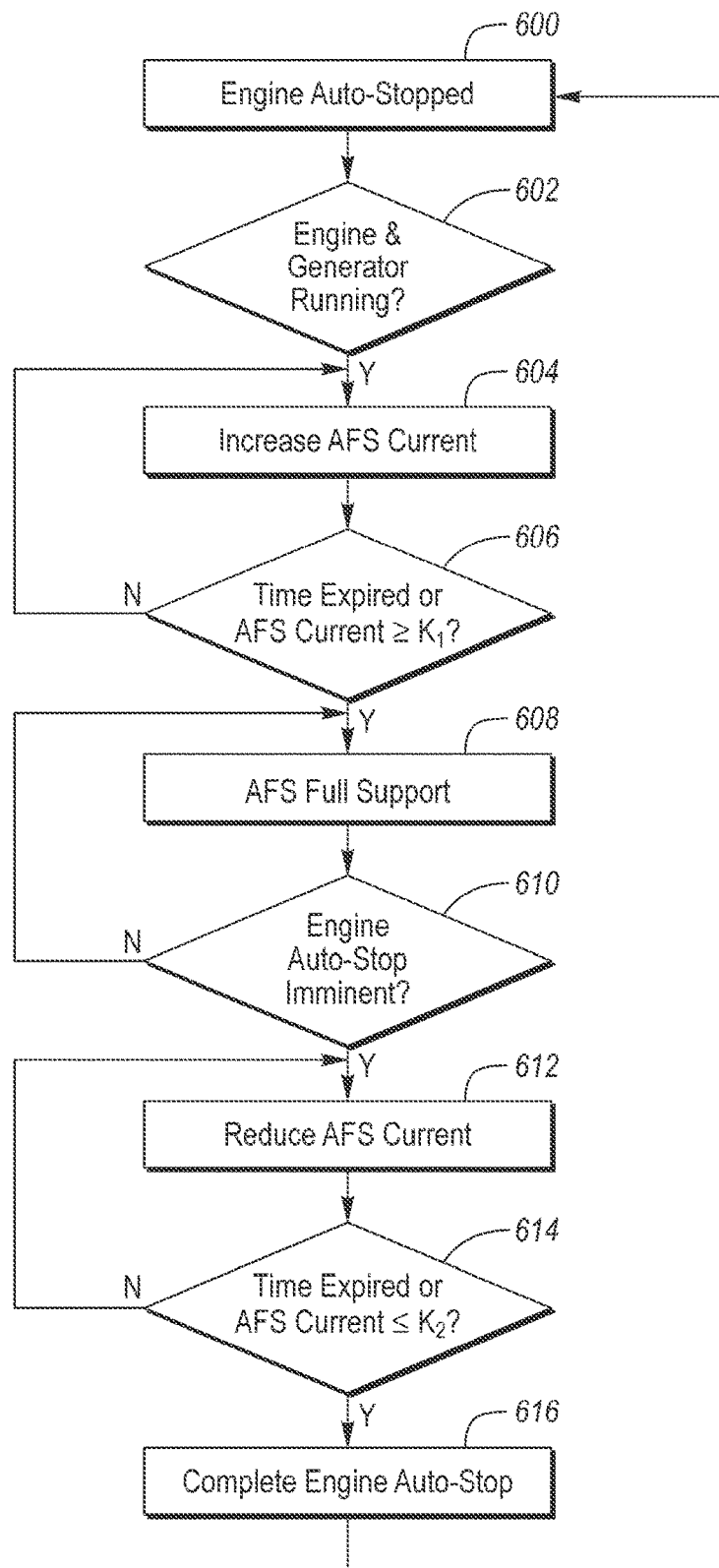
FIG. 6 is a flowchart depicting a possible sequence of operations for managing active front steering demand current during engine autostart and autostop events.

FIG. 6 depicts a flowchart of a possible sequence of operations that may be implemented in the AFS controller 154. At operation 600, the vehicle is in an engine autostopped state. At operation 602, a check may be made as to whether the engine 112 is running and the electric machine 114 is generating electrical energy (e.g., engine and generator are running). If the engine and generator are running, operation 604 may be executed. If the engine or generator are not running, operation 602 may be repeated.

At operation 604, the AFS current may be increased at the predetermined increase rate up to a requested demand current. The increase in current may be a linear increase or ramp. In some configurations, the increase in current may have different increase rates at different phases of the current increase. The predetermined increase rate may be based on the maximum engine torque increase rate. At operation 606, a check may be made to determine is the current increase is completed. The check may be based on expiration of a predetermined amount of time or the AFS current exceeding a threshold value. The threshold value may be a requested demand current of the AFS system that may depend on the steering system operation. If the current increase is complete, operation 608 may be executed. If the current increase is not complete, execution may return to operation 604.

At operation 608, AFS full support may be achieved. The AFS 120 may operate up to a maximum AFS operating current and full AFS function may be realized. At operation 610, conditions for an imminent engine autostop may be checked. Conditions for an imminent engine autostop may include the vehicle decelerating to a speed less than a predetermined speed threshold, application of the brake system, and/or a status indication from the powertrain controller. If the conditions for an imminent engine autostop are not satisfied, execution may return to operation 608. If the conditions for an imminent engine autostop are satisfied, operation 612 may be executed.

At operation 612, the AFS current may be reduced at a predetermined decrease rate to a minimum current value. The predetermined decrease rate may be based on the maximum engine torque reduction rate. At operation 614 a check may be performed to determine if the current reduction is complete. The check may be based on expiration of a predetermined amount of time or the AFS current becoming less than a predetermined current limit. If the AFS current reduction is not complete, execution may return to operation 612. If the AFS current reduction is complete, operation 616 may be executed. At operation 616, the engine autostop may be completed. Operation may then return to operation 600.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine;
an active front steering system including an electric actuator; and
a controller programmed to, responsive to receiving a request to transition the engine to an autostop state while a demand current for the electric actuator exceeds a predetermined current, reduce the demand current to the predetermined current at a predetermined rate corresponding to a maximum engine torque reduction rate prior to transitioning the engine to the autostop state.

2. The vehicle of claim 1 wherein the controller is further programmed to, in response to the vehicle decelerating to a speed less than a predetermined speed, reduce the demand current at the predetermined rate.

3. The vehicle of claim 1 wherein the predetermined current is a current level that prevents a transition to an autostart state.

4. The vehicle of claim 1 wherein the predetermined rate is such that the reduction is completed in a predetermined amount of time.

5. The vehicle of claim 4 wherein the predetermined amount of time decreases as a difference between a present operating current and the predetermined current decreases.

6. The vehicle of claim 1 wherein the controller is further programmed to transition the engine to the autostop state in response to the demand current achieving the predetermined current.

7. The vehicle of claim 1 wherein the predetermined current is a current level that permits transitioning the engine to the autostop state.

8. A method for controlling a demand current of an electric actuator for an active front steering system in a vehicle comprising:
reducing by a controller the demand current of the electric actuator at a predetermined rate that corresponds to a maximum engine torque reduction rate responsive to a request for engine autostop; and
reducing by an engine controller engine torque at the maximum engine torque reduction rate to prevent changes in engine speed.

9. The method of claim 8 further comprising increasing by the controller the demand current of the electric actuator at an other predetermined rate that is based on a maximum engine torque increase rate in response to completion of an engine autostart to prevent engine sag.

10. The method of claim 9 further comprising increasing by the controller the demand current at the other predetermined rate for a first predetermined time and, after the first predetermined time, increasing the demand current at yet an other predetermined rate for a second predetermined time.

11. The method of claim 10 further comprising maintaining by the controller the demand current at a predetermined current value for a predetermined hold time after the first predetermined time before increasing the demand current at the yet an other predetermined rate.

12. The method of claim 9 wherein the other predetermined rate is greater than the yet an other predetermined rate.

13. The method of claim 8 further comprising reducing by the controller the demand current to a predetermined current level in response to the request for engine auto stop.

* * * * *